United States Patent [19]
Kropfli et al.

[11] 3,739,377
[45] June 12, 1973

[54] METHOD AND APPARATUS FOR TARGET DISCRIMINATION IN A CLUTTER ENVIRONMENT

[75] Inventors: Robert A. Kropfli, College Park; Isadore Katz, Bethesda; Kenneth F. Tritabaugh, Rockville; Richard M. Beard, Silvers Spring, all of Md.

[73] Assignee: The United States of America as represented by the Secretary of the Navy, Washington, D.C.

[22] Filed: Oct. 17, 1967

[21] Appl. No.: 676,678

[52] U.S. Cl. .................................... 343/5 R
[51] Int. Cl. .................................... G01s 9/02
[58] Field of Search .................... 343/5, 11, 17

[56] References Cited
UNITED STATES PATENTS
2,859,437 11/1958 Atlas .................................... 343/11
3,029,429 4/1962 Rodgers ........................... 343/5 X
3,035,259 5/1962 Anderson et al. .................. 343/5

*Primary Examiner*—Malcolm F. Hubler
*Attorney*—R. S. Sciascia and J. A. Cooke

[57] ABSTRACT

A method and apparatus for improved detection of radar targets in a clutter environment are disclosed. Basically, a plurality or series of so-called video slicer circuits are selectively preset to discriminate against all input video signals except those within a specified intensity level band; i.e., whenever the received radar signal is within the band for which a particular slicer is set, this slicer provides a constant voltage output signal, whereas, when the radar video is outside the band, a zero output voltage results. Inasmuch as the radar returns from a target will remain within at least one intensity level band for measurably longer time interval than the surrounding clutter, improved target discrimination is accomplished by sensing the time interval during which the radar returns remains within each preset level band and in this manner all clutter outside the preset intensity level band is effectively eliminated. Various methods of processing the slicer output information are also disclosed. For example, in one method, a separate radar scope display is connected to the output of each video slicer; whereas, in two other proposed methods, the video slicer outputs provide automatic discrimination of targets on the basis of intensity fluctuations.

9 Claims, 5 Drawing Figures

Patented June 12, 1973

METHOD AND APPARATUS FOR TARGET DISCRIMINATION IN A CLUTTER ENVIRONMENT

BACKGROUND OF THE INVENTION

Present day radar systems have many uses, among which are the detection, acquisition and tracking of air and surface targets, including; aircraft, ships, missiles, etc. Under certain circumstances and geometries these radars are limited in their function by so-called "clutter" or reflections from unwanted targets in or near the actual target region under surveillance. Such clutter can be produced by fixed ground targets, the sea surface or the atmosphere, and much research has been performed in an effort to find the exact nature of radar returns from ground clutter, sea clutter, and atmospheric clutter.

The range of reflectivity from such clutter is large: even the least sensitive radars can detect the usually strong nearby echoes from land targets; whereas, it takes high-powered, narrow-beam and very sensitive radars to detect relatively weak echoes from clear air. However, regardless of the clutter source or strength, there is always some class or size of target with which the clutter competes and which it can obscure on a radar scope.

Various methods have been proposed heretofore to alleviate somewhat the deleterious effects of clutter. Among these are: the use of the doppler difference between the target and the clutter or so-called moving target indicator (MTI); the use of area MTI in which clutter areas which are present from scan to scan are subtracted from the display; the use of sensitivity time control (STC) which reduces the gain of the radar system at close ranges; and, the use of matched filter techniques to increase the signal-to-noise ratio in a clutter environment. All of these systems are valuable, at least to some extent, in reducing the clutter environment but, nonetheless, they all suffer from a variety of limitations, so that none is completely successful under all conditions and geometries. For this reason the search continues for an improved method for clutter rejection to replace these previously proposed systems or perhaps to be used in conjunction with one or more of them to improve the overall clutter rejection ability.

DESCRIPTION OF THE INVENTION

With the above in mind, a general object of the present invention is to provide a method and apparatus which function to reduce the effects of radar clutter, in order to improve the signal-to-clutter ratio in clutter environments.

Another object of the present invention is to provide a method and apparatus employing circuitry which effectively discriminates against all radar video signals except those signals within a preselected intensity level range, to thereby provide improved detection of radar targets in a clutter environment.

Another object of the present invention is to provide a radar system utilizing a series of so-called video slicers and to provide various methods or techniques for utilizing or processing the output signals from such video slicers, in order to provide improved detection of radar targets in a clutter environment.

Another object of the present invention is to provide a method and apparatus especially adapted for investigating the probability density function of atmospheric radar echoes.

Other objects, purposes and characteristic features of the present invention will in part be pointed out as the description of the present invention progresses and in part be obvious from the accompanying drawings, wherein.

As will be explained in more detail hereinafter when considering the block diagram of FIG. 1, the method and apparatus of the present invention utilize a device called an intensity slicer circuit which discriminates against all video signals except those signals within a specified intensity level band or window. More specifically, whenever an echo is found to be within this preselect intensity band, the slicer provides a constant voltage output; whereas, signals outside of this band result in a zero volt output from the slicer circuit. Thus, if a fluctuating target is repeatedly illuminated at the radar pulse repetition frequency, a certain fraction of the echoes from this target will be found within the slicer's preselected intensity level band, and moreover, the number of slicer output pulses obtained from a particular point in space is proportional to the fraction of time the echo spends within that intensity level band.

In accordance with the present invention, it is proposed here to employ a series of slicers which can be set to cover the entire range of echoes expected to be received from a target within a clutter environment. In general, there exists at least one band in which the target spends a measurably greater fraction of time than the surrounding clutter. The output signal of this particular slicer (or slicers) will accordingly indicate this and thereby provide greater target detectability than the previous proposed target discrimination methods mentioned above. Moreover, inasmuch as the method and apparatus of the present invention functions by considering only signals within this preselected intensity level band, targets with mean signal strength several decibels below mean clutter signal strength can readily be detected. Stated somewhat differently, the proposed slicer method eliminates all clutter outside the intensity level band from competing with the target.

Figure 2:
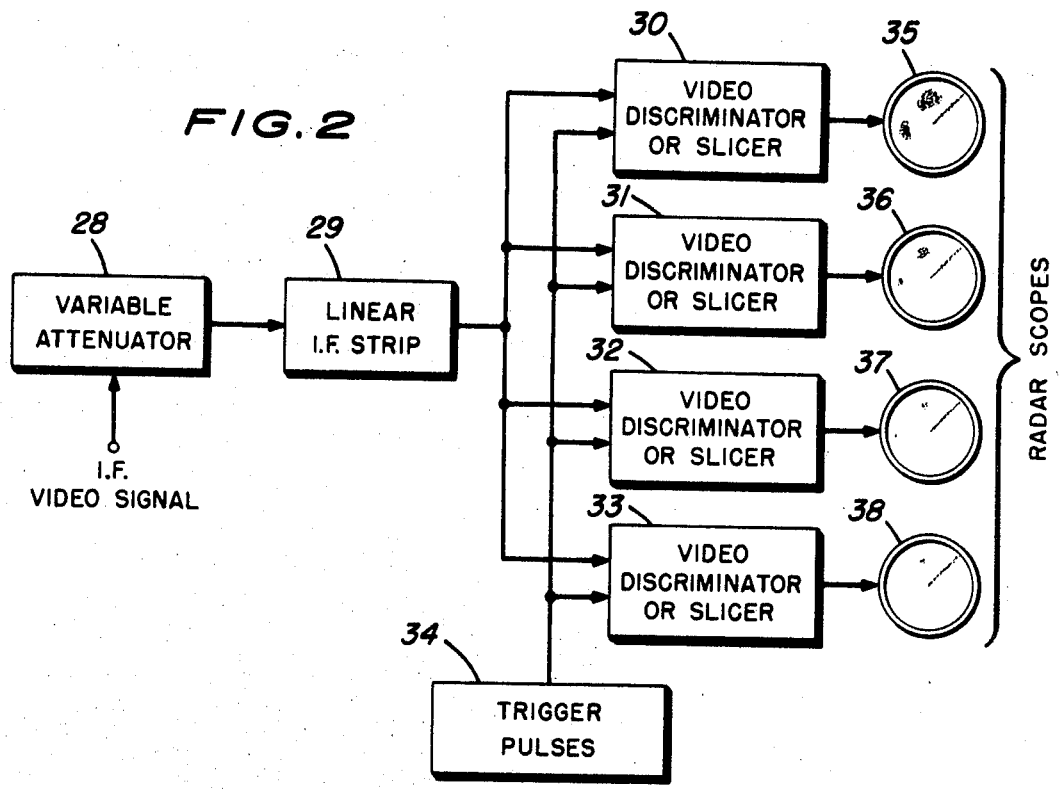
FIG. 2 is a simplified block diagram illustrating one embodiment of the proposed radar target discrimination system of the present invention, employing a plurality of video slicer circuits, such as that illustrated in FIG. 1, whose respective output signals are processed by applying them to separate radar display scopes.

Several methods of processing the slicer output signals are contemplated, in accordance with the present invention. For example, the method illustrated in FIG. 2 uses a separate radar scope display for the output of each video slicer. As will be described hereinafter when considering FIG. 5, this multiple-scope method has particular utility in radar-weather studies using plan position indicators (PPI) or range height indicators (RHI). When the processing method shown in FIG. 2 is employed for radar target discrimination, an observer or camera is obviously required to monitor each display for any unidentified targets.

Figure 3:
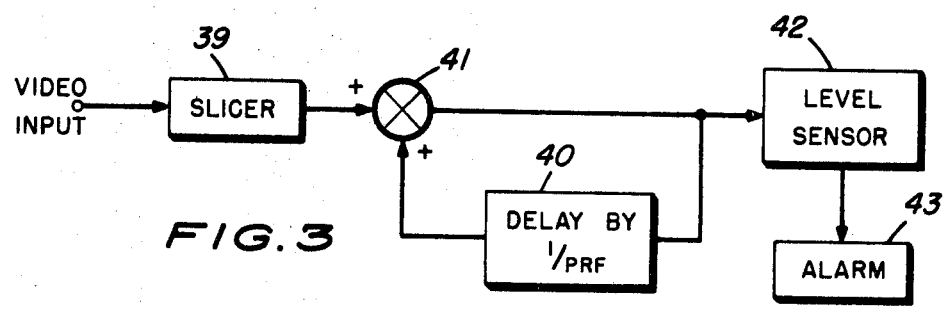
FIG. 3 is a simplified block diagram illustrating an alternative method of processing the video slicer output signals in a target discrimination system of the present invention.

An alternate method of processing the video slicer outputs is shown in FIG. 3 and requires no visual monitoring. Instead, the output of each slicer is sent through a delay line integrator which keeps track of the sum of slicer pulses at each range for a specified length of time. Inasmuch as return signals from specular or actual radar targets fluctuate much less than echoes from undesirable clutter such as clouds, the ocean, etc., these point targets result in a build-up of pulses at a particular range in one or perhaps two integrators; whereas, the more fluctuating clutter would not. The contents of each integrator are then continuously examined and an alarm is triggered whenever a threshold level is exceeded. The integration time of the delay line integrator is preferably determined by the radar beamwidth and scan rate, such that the integrators contain information from no more than one bearing.

Figure 4:
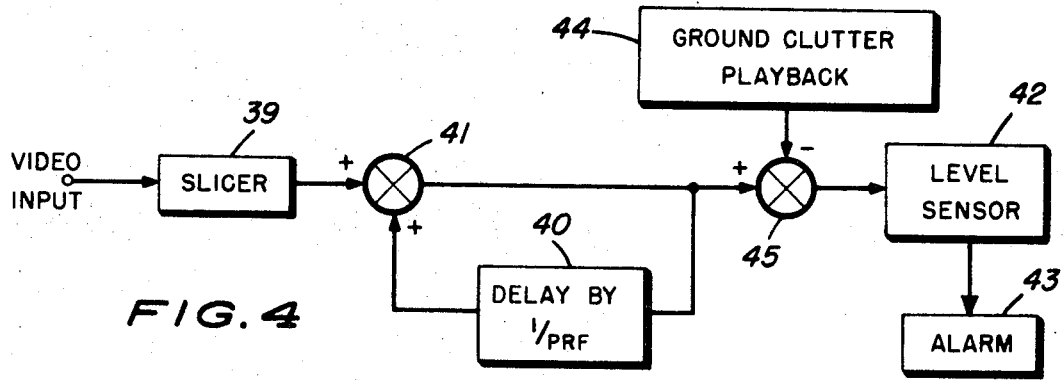
FIG. 4 is a simplified block diagram illustrating a modification of the signal processing method shown in FIG. 3.

In the embodiment of FIG. 4, the method illustrated in FIG. 3 is incorporated with the previously mentioned area MTI technique. More specifically, each integrator contains sliced video information integrated over a length of time necessary for the beam to sweep through its width. The instantaneous information at a particular range in all integrators is therefore essentially the probability density function of the target that has just been illuminated at that range. In the method proposed in FIG. 4, the sliced video of ground clutter is stored, for example, on video tape, when no targets are present. Subsequently, when an actual PPI search scan is performed, the contents of each delay line integrator is matched against the stored sliced video for the corresponding slice level. When the difference between stored information and the most recently obtained information is large, for all slice levels, an alarm is then triggered to indicate the presence of a target.

It is well-known that echoes from five or ten targets within a radar pulse volume have a broad probability density function; whereas, when the pulse volume contains only one or a few targets the probability density function of the signal is sharply peaked. The sharp peak in the density function, which is therefore necessary for detection by the method illustrated in FIG. 3, might not be present under all conditions, and consequently, the technique shown in FIG. 4 has the advantage that it provides an alarm now only when the shape of the probability density function changes, but also when its position along the intensity level axis is changed.

Figure 1:
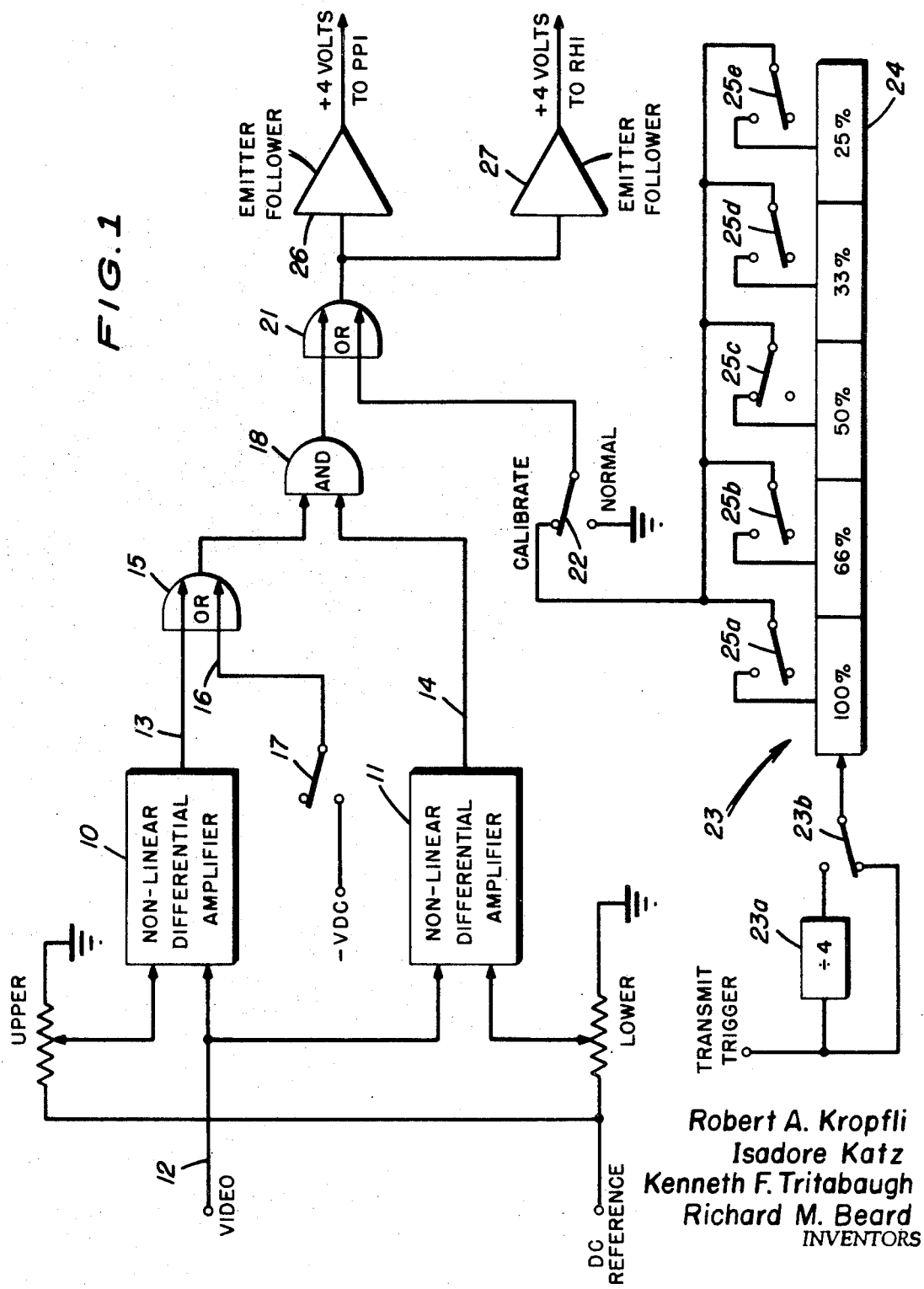
FIG. 1 is a block diagram of one embodiment of the video slicer circuit proposed in accordance with the present invention.

Referring now to FIG. 1 of the accompanying drawings, a typical video slicer, as proposed in accordance with the present invention, includes a pair of non-linear differential amplifiers 10 and 11 each connected to receive the input radar video signal from input 12. The other input to each of the differential amplifiers 10 and 11 is connected to a source of DC reference voltage. More specifically, the second input to differential amplifier 10 is connected to one level of DC reference voltage produced by the potentiometer designated as UPPER in FIG. 1; whereas, the second input to differential amplifier 11 is produced at the potentiometer labelled LOWER. The reference voltages produced at the UPPER and LOWER potentiometers are adjusted to represent the upper and lower limits respectively of the desired intensity level band or window for the illustrated slicer circuit.

Moreover, calibration of the slice levels can readily be accomplished with a conventional test signal generator which is the usual daily reference at most radar sites and which simply provides a video signal of known strength. Since the distribution of signals from a signal generator is nearly symmetric and sharply peaked, the UPPER and LOWER potentiometers of FIG. 1 can be adjusted separately to yield a 50 percent slicer output for the appropriate signal generator output. In such a condition, the slice level is sufficiently close to the known signal from the generator.

The non-linear differential amplifier 10 functions, in a well-known manner, to provide an output on line 13 only when the magnitude of the input video signal is less than the voltage level supplied by the UPPER potentiometer; whereas, differential amplifier 11 produces an output on line 14 only when the magnitude of the input radar video is greater than the voltage supplied by the LOWER potentiometer. An OR circuit 15 has one of its inputs connected to the output 13 of differential amplifier 10 and its other input 16 connected to switch 17. The switch 17 has two positions and when in the illustrated upper position, the input 16 of the OR gate 15 is disconnected and the circuitry of FIG. 1 operates as a slicer; whereas, in the lower position of switch 17, a preselected minus DC voltage is connected to the input 16 of OR gate 15 and causes the FIG. 1 circuitry to act as a threshold detector. An AND circuit 18 receives the outputs from the differential amplifier 11 and the OR gate 15 and, assuming that the switch 17 is in its uppermost position (as illustrated), provides an output only when the input radar video signal is between the intensity level limits represented by the UPPER and LOWER reference voltages.

The output of the AND gate 18 is connected as one input to an OR gate 21, whose other input is connected to switch 22. When the switch 22 is in its lower position, the associated input of the OR circuit 21 is grounded; whereas, when the switch 22 is in its upper position (as illustrated), the OR gate 21 is connected to a time controlled pulse triggering circuit, generally designated at 23, which controls the pulse input to the OR gate 21 to be a variable percentage of the transmitter pulse repetition frequency. More specifically, the transmit trigger pulse is connected, by switch 23b, either directly or via a divide-by-four circuit 23a, to a five-stage shift register 24 whose respective stages correspond to various preselected percentages of the radar's pulse repetition frequency, such as those designated in FIG. 1, for example. Switches 25a through 25e are provided and selectively connect the desired stage of the shift register 24 to the lower input of the OR gate 21. The purpose for employing this time-controlled pulsing circuit apparatus 23 will be described in more detail hereinafter, when considering the method illustrated in FIG. 5 of the drawings.

During normal operation of the video slicer circuitry of FIG. 1, when detecting radar targets in the presence of clutter, this lower input of the OR gate 21 is grounded at the switch 22. As a result, the output of OR gate 21 is a constant DC voltage only when the video input signal falls within the intensity level band for which the illustrated slicer is preset. The output of the OR gate 21 is connected, via emitter followers 26 and 27 for example, to an associated PPI and/or RHI scope where it is displayed.

The manner(s) in which the video slicer circuitry, just described, is employed in a target detection system, will now be described in connection with FIGS. 2, 3 and 4 of the drawings. Referring more specifically to FIG. 2, the input radar video signal is applied, through a variable attenuator circuit 28 and linear IF strip 29, simultaneously to a group of video discriminators or slicers 30 through 33, each similar to that shown in FIG. 1 of the drawings. However, the respective intensity level bands, for which each of the illustrated video slicers 30 through 33 is set, are slightly different from one another; i.e., the slicer group 30–33 covers a predetermined range of adjacent intensity level bands. In FIG. 2, the illustrated trigger pulse source 34 is intended to represent the application of time-controlled triggering pulses, such as those produced by circuitry 23 of FIG. 1, to the video slicers 30–33, for reasons to be described in detail hereinafter.

In the target discrimination system shown in FIG. 2, the resultant output signals from video slicers 30–33 are then processed by connecting a separate display scope 35, 36, 37 and 38 to the output of the respective video slicers. An operator (or camera) monitors the four scopes 35–38 and can readily observe the radar target, even though it is positioned in a region of considerable radar clutter, since each of the associated video slicers operates to reject the clutter and permit only target video signals existing within the associated predetermined intensity level band to be presented on the radar scope. In other words, since a radar target is less fluctuating than radar clutter, and therefore the target echo would remain within a particular video slicer intensity level band or window for a greater period of time, it (a target) would produce a correspondingly greater number of constant voltage pulses from the associated slicer. This, in turn, produces a region(s) of greater intensity on the connected radar scope and enables the monitoring operator or camera to readily pick out radar target indications from the radar scope displays 35 through 38. Scope brightness is thus related to the probability of the signal being found within the intensity level band or window or the area under the probability density curve bounded by the slicer intensity levels. It should also be noted in FIG. 2 that the variable IF attenuator unit 28 affords a convenient manner of simultaneously varying the video intensity band or window for all slicers 30–33.

As mentioned previously, the method of processing the video slicer output information illustrated in FIG. 3 of the drawings, allows for automatic discrimination of radar targets, from clutter, on the basis of intensity fluctuations. More specifically, a typical slicer channel incorporating this alternate method of processing the input video information is illustrated in FIG. 3 and contains a slicer 39 which functions, in a manner exactly the same as that previously described, to produce a constant DC output voltage whenever the input video signal falls within the associated intensity level band or window.

The slicer output is then applied, along with the feed back output of delay circuit 40, to a signal combining or mixer circuit 41 which adds the two applied signals together. Inasmuch as the delay circuit 40 has a delay equal to the reciprocal of the radar pulse repetition frequency (PRF), it and signal combining circuit 41 function together as a delay line integrator which totals or keeps a running sum of the input video information. This delay line circuit combination 40–41 applies its output to a suitable level sensing circuit 42 which, it turn, controls a suitable alarm means 43. As soon as the delay line integrator output exceeds the predetermined level set by sensor 42, as would happen only in the presence of a non-fluctuating, video signal produced by a target, the alarm 43 is sounded automatically.

As mentioned previously, the processing method illustrated in FIG. 4 is quite similar to that shown in FIG. 3 with the exception that it improves upon FIG. 3 by the inclusion of means for introducing a signal (previously recorded on tape, for example), representative of stable ground clutter, in synchronism with the input video signal, for the purpose of preventing false alarms due to relatively stable clutter. More specifically, in the absence of atmospheric, aircraft or man-made clutter, a tape recording is made of the output of the delay line integrator 40–41 and this recorded signal represents stable ground clutter. Subsequently, this recorded ground clutter signal is played back, as designated at 44, in sweep synchronism with the actual search, by applying it to signal combiner or mixer 45 where the stable ground clutter is subtracted from the integrated slicer output prior to its application to the level sensor 42.

Figure 5:
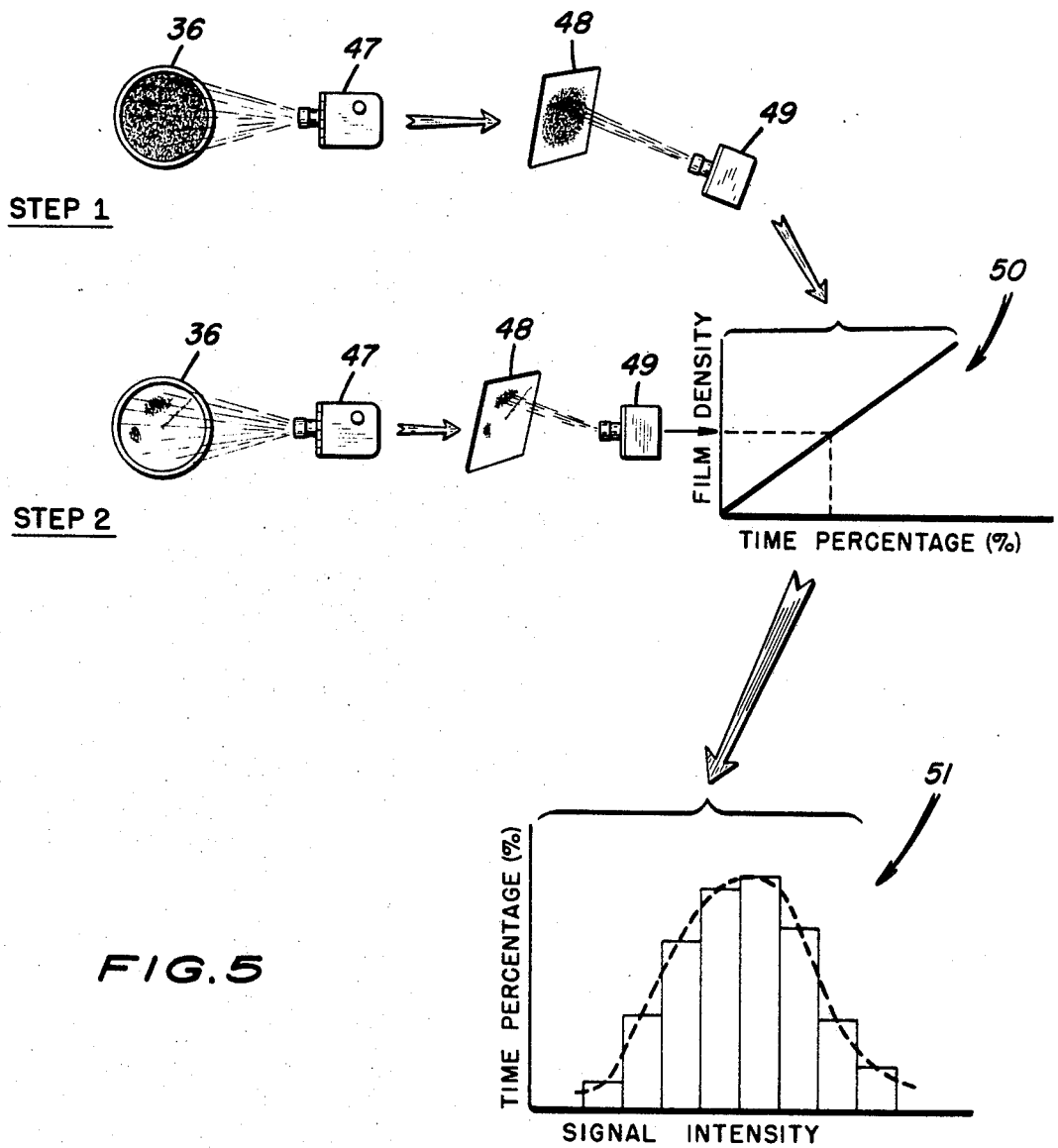
FIG. 5 is a simplified block diagram illustrating the same embodiment of the present invention as is shown in FIG. 1, when employed for the purpose of measuring the probability density function of atmospheric radar echoes.

FIG. 5 of the drawings illustrates one manner of using the method and apparatus of the present invention for the purpose of measuring the probability density function of atmospheric radar echoes. As is well-known to those involved in the study of weather phenomena, knowing the probability density function permits the accurate computation of reflectivity, for example, within the order of one decibel. More specifically, the proposed method of FIG. 5 for measuring the probability density function of atmospheric echoes involves first the application of the previously discussed time-controlled trigger pulses from the source 34 to the various slicers shown in FIG. 2 (each of which may be as illustrated in FIG. 1), with the video slicers being disconnected from input video information. For example, the switch 22 in FIG. 1 would be set to its "calibrate" position, to apply the timed trigger pulses, from the circuitry 23, to each slicer, and, as each of the switches 25a through 25e is selectively set, a photograph of display scope (such as that designated at 36 in STEP 1 in FIG. 5) is taken by a camera 47 to produce a corresponding film 48. In FIG. 5, it has been assumed that the triggering pulses are sufficiently long so that calibration signals are displayed at all ranges on the display scope 36, for example. A photodensitometer 49 then reads the film density of the film 48 at a particular region of interest, for each time percentage of trigger pulse actuation; i.e., at 25, 33, 50 percent etc. (see FIG. 1), to produce at a corresponding calibration curve 50 of film density versus time percentage within the intensity level band of each slicer circuit.

Subsequently (see STEP 2 in FIG. 5), the input video information is inserted and displayed upon the scopes 35–38, in FIG. 2. Once again the camera 47 takes a picture to produce a film 48 which is read by the photodensitometer 49, at the same point of interest, to obtain a reading of film density. Using this film density reading, the operator now merely reads, from the calibration curve 50 for each slicer the corresponding percentage of time within that slicer's intensity level. This operation is represented by the dotted line on curve 50. By then repeating this procedure for each slicer and knowing the intensity level for each slicer, the operator is able to reproduce a histogram 51 of time percentage versus the known signal intensity level bands of the slicer circuits and thereby accurately approximate the desired probability density function curve. As shown in FIG. 5, eight different intensity level bands were utilized to produce the histogram 51. Obviously, by using a greater number of slicers, one would be able to obtain a better maximum resolution in producing the probability density function curve.

Many modifications, adaptations and alterations of the present invention are possible in the light of the above teachings. Therefore, it should be understood at this time that the present invention may be practiced otherwise than as specifically described and yet be within the scope of the appended claims.

What is claimed is:

1. A method for measuring the probability density function of radar echoes, comprising the steps of, applying as a simultaneous input to a plurality of video slicer circuits successive calibration pulses having different known repetition rates, said plurality of video slicer circuits being preset to be associated respectively with adjacent intensity level bands and each of said video slicer circuits being capable of providing an output signal indicating whether or not its input signal is within its associated intensity level band, displaying the output of each of said video slicer circuits on a separate display scope, producing a first photographic film of the presentation of each of said display scopes upon application of said different calibration pulse repetition rates to said video slicer circuits, detecting the film density of each of said first photographic films at a predetermined point of interest, plotting a calibration curve of the detected film density as a function of the timing of said calibration pulses, applying a video signal corresponding to said radar echoes as a simultaneous input to each of said video slicer circuits, producing a second photographic film of the presentation of each of said display scopes upon application of said video signal as input to said video slicer circuits, detecting the film density of each of said second photographic films at the same predetermined point of interest, and successively reading from said calibration curve the pulse repetition timing corresponding to the film density value detected at said predetermined point of interest on each of said second photographic films when said video signal is applied to said video slicer circuits, the manner in which the value of said pulse repetition timing varies from reading to reading of said calibration curve corresponding to the variation in probability that radar echoes exist in the respective intensity level bands associated with said video slicer circuits.

2. Apparatus for detecting radar echoes in response to an input radar video signal, comprising, a plurality of video slicer circuits each operably connected to receive said input video signal and capable of providing an output signal indicating whether or not said input video signal is within an associated predetermined intensity level band, means operably connected to each of said video slicer circuits for presetting said video slicer circuit to be associated respectively with adjacent intensity level bands, said adjacent intensity level bands being selected to cover the entire intensity level range expected to be received from radar echoes of interest, detection means connected to receive the output signal from each of said video slicer circuits and to detect whether said output signal is fluctuating in intensity, target alarm means operably connected to said detection means for providing an alarm indication dependent upon whether the output signal from said video slicer is fluctuating in intensity, and means for preventing the operation of said target alarm means in response to stable radar clutter.

3. The apparatus specified in claim 2 wherein said detection means includes, a delay line integrator connected to receive the output signal from said video slicer, and a level sensing circuit means operably connected to said delay line integrator for producing an output signal indicating when the integrated value of said slicer output signal exceeds a predetermined value.

4. The apparatus specified in claim 2 wherein said prevention means comprises, a source of signal indicative solely of stable radar clutter, and means for combining said clutter signal in synchronism with the output signal from said delay line integrator.

5. The apparatus specified in claim 4 wherein said clutter signal source is a tape recorded signal produced in the absence of atmospheric, aircraft and manmade clutter.

6. The apparatus specified in claim 2 wherein each of said video slicer circuits comprises, a voltage source for producing first and second reference voltage levels representing respectively the upper and lower limits of said associated intensity level band for that slicer circuit, and differential amplifier means connected to receive as inputs said video input signal and each of said first and second reference voltage signals for providing an output signal only so long as the magnitude of said input video signal lies between said first and second input reference voltage levels.

7. Apparatus for detecting radar echoes in response to an input radar video signal, comprising, a plurality of video slicer circuits each operably connected to receive said input video signal and capable of providing an output signal indicating whether or not said input video signal is within an associated predetermined intensity level band, means operably connected to each of said video slicer circuits for presetting said video slicer circuit to be associated respectively with adjacent intensity level bands, said adjacent intensity level bands being selected to cover the entire intensity level range expected to be received from radar echoes of interest, a plurality of radar display scopes each connected to the output of a different one of said video slicers, means for applying a variable calibration signal simultaneously to each of said video slicers, said calibration signal being variable to cause said video slicers to produce their respective output signals for predetermined time intervals, photographic means for monitoring the display of each of said radar scopes in response to the output signal from said slicers when both said variable calibration signal and said input video signal are applied thereto, and means responsive to the condition of said photographic means for determining the probability density function of said radar echoes.

8. Apparatus is specified in claim 7 wherein said calibration signal applying means includes a source of pulses of variable pulse repetition frequency.

9. The apparatus as specified in claim 7 wherein said photographic monitoring means includes a first film taken of each display during application of said input video signal, a series of second films taken of each display during each application of said variable calibration signal, and photodensitometer means for measuring the film density of each of said first and second films at predetermined regions of interest.

* * * * *